(12) United States Patent
Omura (10) Patent No.: US 12,483,092 B2
(45) Date of Patent: Nov. 25, 2025

(54) CLUTCH-EQUIPPED MOTOR AND ELECTRIC CHAIN BLOCK

(71) Applicant: KITO CORPORATION, Yamanashi (JP)

(72) Inventor: Shinya Omura, Yamanashi (JP)

(73) Assignee: KITO CORPORATION, Yamanashi (JP)

( * ) Notice: Subject to any disclaimer, the term of this patent is extended or adjusted under 35 U.S.C. 154(b) by 309 days.

(21) Appl. No.: 18/032,190

(22) PCT Filed: Oct. 18, 2021

(86) PCT No.: PCT/JP2021/038442
§ 371 (c)(1),
(2) Date: Apr. 17, 2023

(87) PCT Pub. No.: WO2022/085629
PCT Pub. Date: Apr. 28, 2022

(65) Prior Publication Data
US 2023/0396127 A1 Dec. 7, 2023

(30) Foreign Application Priority Data
Oct. 22, 2020 (JP) .................................. 2020-177449

(51) Int. Cl.
*H02K 7/108* (2006.01)
*B66D 3/20* (2006.01)
(Continued)

(52) U.S. Cl.
CPC .............. *H02K 7/108* (2013.01); *B66D 3/20* (2013.01); *F16D 13/40* (2013.01); *H02K 7/003* (2013.01)

(58) Field of Classification Search
CPC ... B66D 1/12; B66D 1/58; B66D 3/18; B66D 3/20; B66D 3/22; B66D 2700/025;
(Continued)

(56) References Cited

U.S. PATENT DOCUMENTS 2,373,007 A * 4/1945 Baynes ..................... B66D 1/12
192/14
4,460,838 A   7/1984 Ulicny
(Continued)

FOREIGN PATENT DOCUMENTS

CN 108675184 A * 10/2018 ............... B66D 3/18
DE 4408578 C2 12/1999
(Continued)

OTHER PUBLICATIONS

International Search Report and Written Opinion mailed on Dec. 21, 2021, received for PCT Application PCT/JP2021/038442, filed on Oct. 18, 2021, 10 pages including English Translation.

*Primary Examiner* — Anna M Momper
*Assistant Examiner* — Henrix Soto
(74) *Attorney, Agent, or Firm* — XSENSUS LLP (57) ABSTRACT

A clutch-equipped motor comprising: a stator capable of generating a rotating magnetic field; a rotor rotated by the rotating magnetic field; a motor shaft capable of rotating with respect to the rotor via a bearing; and a friction clutch mechanism arranged on an end portion side of the rotor in an axial direction of the motor shaft, wherein the friction clutch mechanism has: a clutch plate rotating integrally with the rotor; a connection member having a cylindrical part, the motor shaft and the drive transmission shaft being inserted into an inner cylindrical portion of the cylindrical part in a state of rotating integrally with the cylindrical part; a clutch receiver rotating integrally with the connection member; and a biasing means for biasing the clutch plate and the clutch
(Continued)

receiver in a direction of bringing the clutch plate and the clutch receiver into contact with each other.

11 Claims, 7 Drawing Sheets

(51) Int. Cl.
  *F16D 13/40* (2006.01)
  *H02K 7/00* (2006.01)
(58) Field of Classification Search
  CPC .. B66D 2700/0141; H02K 7/108; H02K 7/12; H02K 7/083; H02K 7/116; H02K 7/14; F16D 13/40
  See application file for complete search history.

(56) References Cited

U.S. PATENT DOCUMENTS

| | | | | |
|---|---|---|---|---|
| 4,502,667 A | * | 3/1985 | Nakamura | B66D 3/22 254/350 |
| 4,605,111 A | * | 8/1986 | Ohno | B66D 3/22 192/56.62 |
| 4,636,962 A | * | 1/1987 | Broyden | B66D 3/20 254/362 |
| 5,081,385 A | * | 1/1992 | Gajar | H02K 7/108 310/78 |
| 5,533,712 A | * | 7/1996 | Fujikawa | B66D 1/58 310/78 |
| 6,966,545 B2 | * | 11/2005 | Eising | B66D 3/20 254/358 |
| 8,910,923 B2 | * | 12/2014 | Moll | B66D 3/20 254/365 |
| 2008/0041651 A1 | | 2/2008 | Ng et al. | |
| 2010/0206683 A1 | | 8/2010 | Hiroshima | |
| 2015/0014615 A1 | | 1/2015 | Koyama et al. | |

FOREIGN PATENT DOCUMENTS

| | | | | |
|---|---|---|---|---|
| DE | 102006001154 B4 | * | 1/2009 | ............ B66D 3/18 |
| FR | 2570688 A | * | 3/1986 | ............ B66C 13/40 |
| JP | S53-42937 B2 | | 11/1978 | |
| JP | S54-11582 B2 | | 5/1979 | |
| JP | 2009-079635 A | | 4/2009 | |
| JP | 2013-184790 A | | 9/2013 | |
| JP | 2015-053839 A | | 3/2015 | |
| JP | 6116451 B2 | | 4/2017 | |
| JP | 2018-173033 A | | 11/2018 | |

\* cited by examiner

CLUTCH-EQUIPPED MOTOR AND ELECTRIC CHAIN BLOCK

CROSS REFERENCE TO RELATED APPLICATIONS

This is a U.S. national stage of application No. PCT/JP2021/038442, filed on Oct. 18, 2021. Priority under 35 U.S.C. § 119(a) and 35 U.S.C. § 365(b) is claimed from Japanese Patent Applications No. 2020-177449, filed on Oct. 22, 2020. The entire content and disclosure of each of foregoing applications is incorporated herein by reference.

TECHNICAL FIELD

The present invention relates to a clutch-equipped motor and an electric chain block.

BACKGROUND ART

There is a configuration including a friction clutch as disclosed, for example, in Patent Literature 1 in an electric chain block for raising and lowering a cargo using a driving force of a motor. In this configuration, when an overload acts in winding up a chain, a sliding surface of a friction clutch (11) slides and a rotor (2) idles to prevent an excessive load from acting on the chain.

Note that in Patent Literature 1, the configuration on an output side of a rotor shaft (1) is not disclosed at all but, generally, the output side of the rotor shaft (1) has a not-illustrated cylindrical connection member attached thereto and is connected to a not-illustrated drive transmission shaft via the connection member. Note that the drive transmission shaft is a shaft for transmitting a drive force to a load sheave via a reduction gear.

Besides, there also is a configuration disclosed in Patent Literature 2 as an electric chain block including a friction clutch. Patent Literature 2 discloses such a configuration that a part of an insertion shaft (71) is inserted into the inside of a large-diameter hollow shaft (26) and a bearing and so on are arranged in the inside of the hollow shaft (26).

CITATION LIST

Patent Literature

{PTL 1} JP 6116451B
{PTL 2} DE4408578C2

SUMMARY OF INVENTION

Technical Problem

Incidentally, in the configuration disclosed in Patent Literature 1, the not-illustrated drive transmission shaft is connected via the not-illustrated connection member to the rotor shaft (1) outside a casing housing a brake motor. Therefore, the length in an axial direction is longer by the amount of the connection member and the drive transmission shaft existing outside the casing. Here, if the length in the axial direction of the electric chain block is tried to be made shorter, the connection member and a clutch receiver (16) or the like interfere with each other.

Besides, in the configuration disclosed in Patent Literature 2, since the large-diameter hollow shaft (26) is used, the size of the casing in a radial direction increases accordingly. Note that because the rotor shaft (1) disclosed in Patent Literature 1 is a solid shaft, its combination with Patent Literature 2 having the hollow shaft (26) is difficult.

The present invention has been made in consideration of the above circumstances and has an object to provide a clutch-equipped motor and an electric chain block which can be reduced in size by shortening an axial length of a motor shaft and can be prevented from increasing in size in a radial direction.

Solution to Problem

To solve the above problem, a first aspect of the present invention provides a clutch-equipped motor for transmitting a driving force to a drive transmission shaft, the clutch-equipped motor including: a stator capable of generating a rotating magnetic field by passing a current through a coil; a rotor arranged in an inner cylindrical portion of the stator and rotated by the rotating magnetic field; a motor shaft inserted through a center in a radial direction of the rotor and capable of rotating with respect to the rotor via a bearing; and a friction clutch mechanism arranged on an end portion side of the rotor in an axial direction of the motor shaft, wherein the friction clutch mechanism has: a clutch plate fixed to an end surface side of the rotor in the axial direction of the motor shaft and thereby rotating integrally with the rotor; a connection member having a cylindrical part, the motor shaft and the drive transmission shaft being inserted into an inner cylindrical portion of the cylindrical part in a state of rotating integrally with the cylindrical part; a clutch receiver arranged on an outer peripheral side of the connection member and rotating integrally with the connection member; and a biasing means for biasing the clutch plate and the clutch receiver in a direction of bringing the clutch plate and the clutch receiver into contact with each other.

Further, in the above invention, it is preferable that the clutch receiver is provided in a flange shape and formed integrally with the cylindrical part.

Further, in the above invention, it is preferable that: the clutch receiver is provided in a ring shape separate from the connection member; and the clutch receiver is coupled to an outer peripheral surface of the connection member in a state of rotating integrally therewith.

Further, in the above invention, it is preferable that a tip side of the motor shaft is located in a shaft hole of a motor casing for housing the stator and the rotor, and an adjustment member for adjusting a biasing force of the biasing means is screwed into a male screw portion on the tip side of the motor shaft located in the shaft hole.

To solve the above problem, a second aspect of the present invention provides an electric chain block, including: the clutch-equipped motor according to the above invention; the drive transmission shaft arranged on a same axis as the motor shaft and rotating integrally with the motor shaft; a reduction mechanism for reducing a speed of rotation from the drive transmission shaft; and a load sheave to which a driving force is transmitted via the reduction mechanism and around which a chain is wound.

Advantageous Effects of Invention

According to the present invention, it is possible to provide an electric chain block which can be reduced in size by shortening an axial length of a motor shaft and can be prevented from increasing in size in a radial direction.

DESCRIPTION OF EMBODIMENTS

First Embodiment

Hereinafter, an electric chain block 10 including a motor part 20 (clutch-equipped motor) according to a first embodiment of the present invention will be explained with reference to the drawings. Note that in the following explanation, a Z-direction represents a direction in which a chain C1 is suspended, and a Z1 side represents a side where an upper hook 90 is located and a Z2 side represents a side opposite thereto where a lower hook 100 is located.

Figure 1:
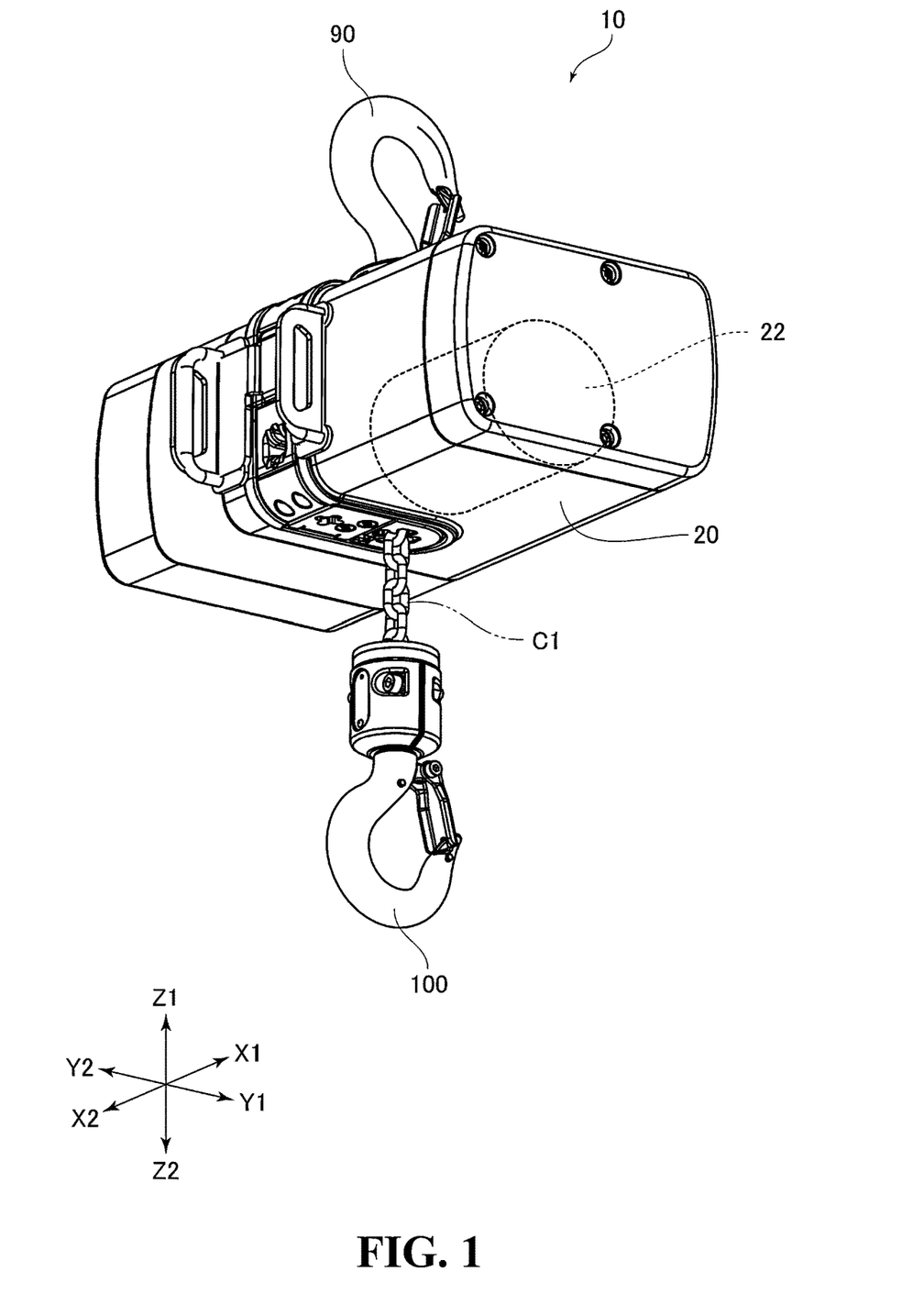
FIG. 1 is a perspective view illustrating a configuration of an electric chain block according to a first embodiment of the present invention.
Figure 2:
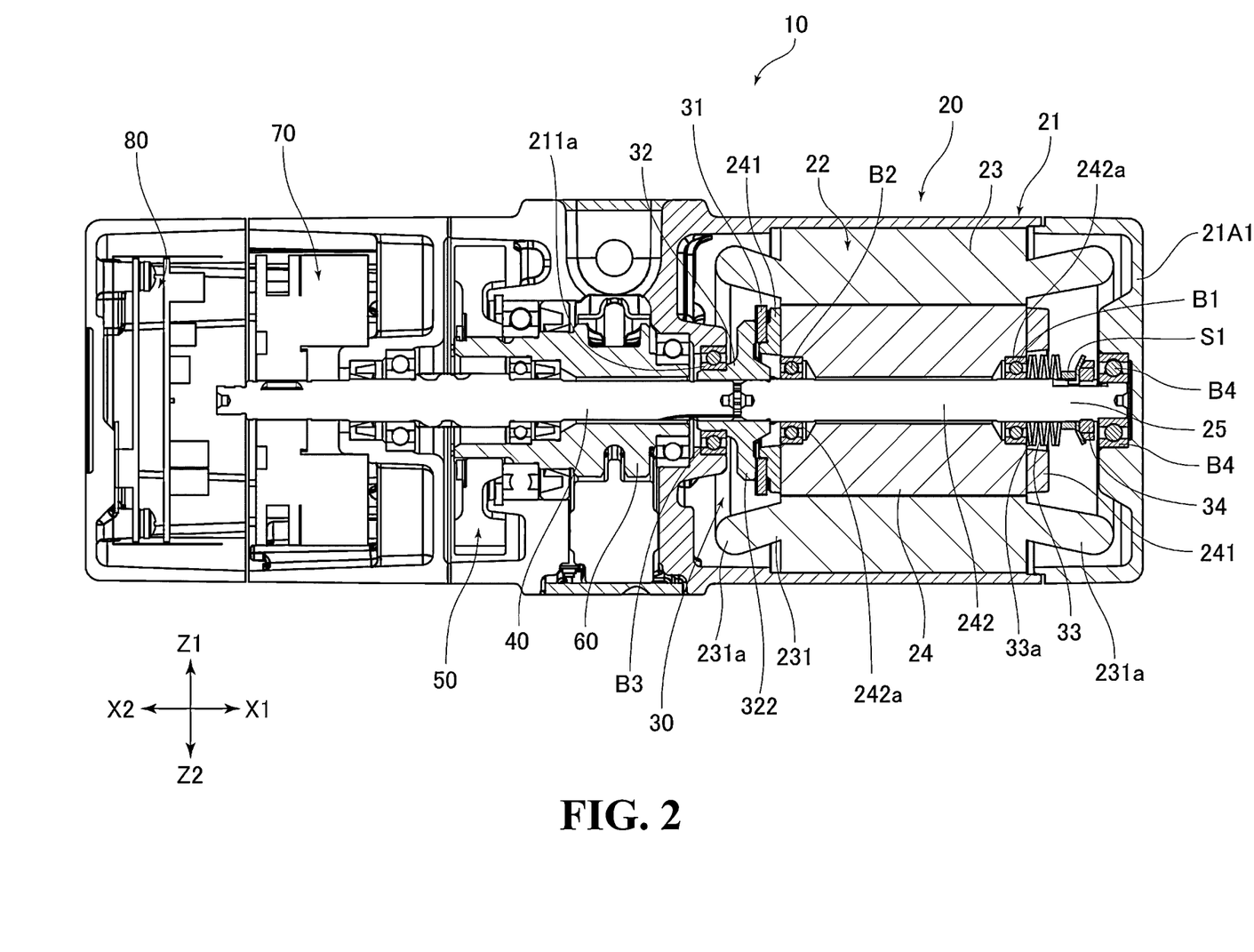
FIG. 2 is a cross-sectional view illustrating a state of cutting the electric chain block illustrated in FIG. 1 in a plane where a motor shaft is cut.

Further, an X-direction represents a long side direction of a motor shaft 25, and an X1 side represents a right side in FIG. 2 and an X2 side represents a left side opposite thereto. Further, a Y-direction represents a direction perpendicular to the Z-direction and to the X-direction, and a Y1 side represents a lower right side in FIG. 1 and a Y2 side represents an upper left side opposite thereto.

<Regarding the Overall Configuration of the Chain Block>

Figure 3:
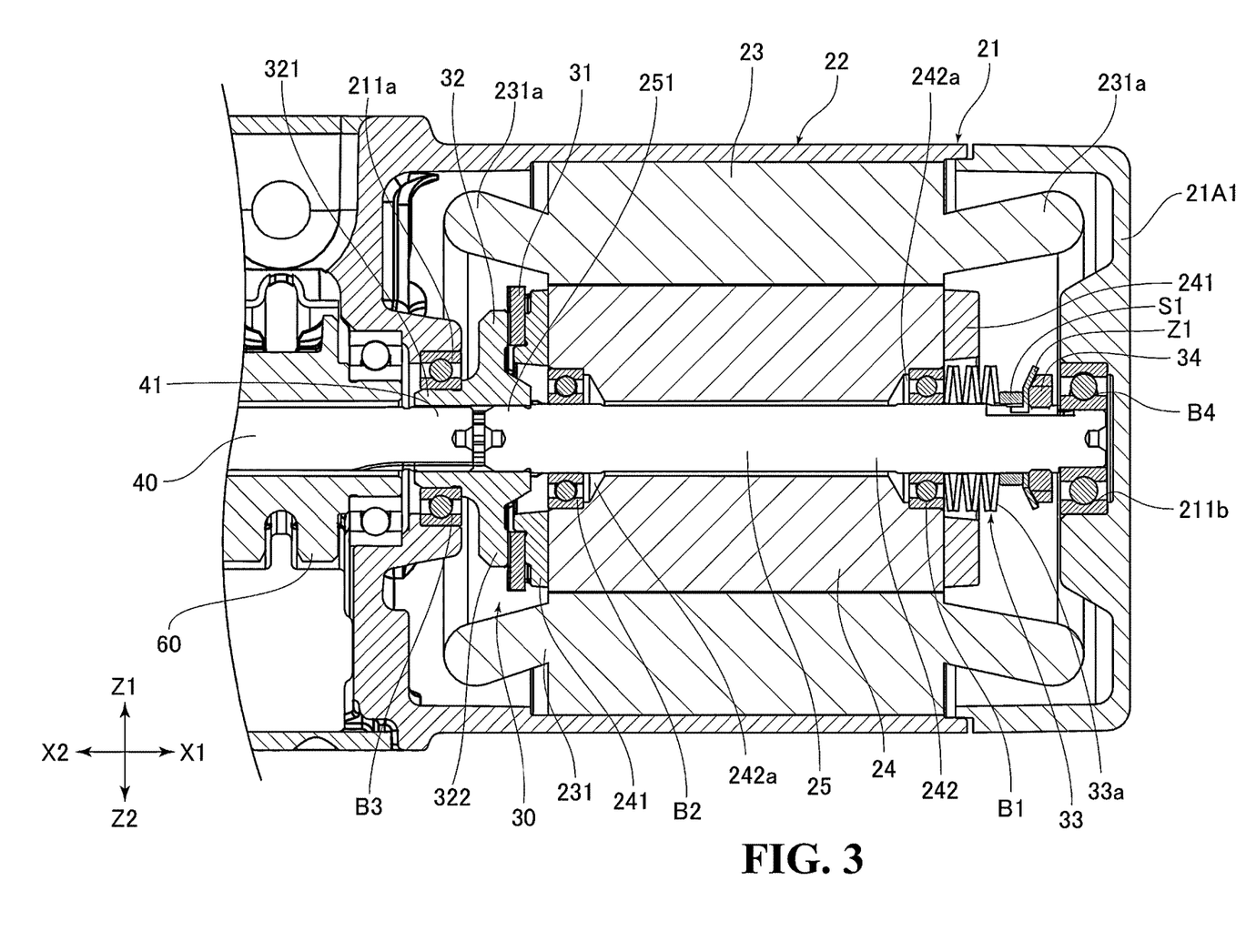
FIG. 3 is a partial cross-sectional view illustrating an enlarged configuration near a motor part (clutch-equipped motor) in FIG. 2.

FIG. 1 is a perspective view illustrating a configuration of the electric chain block 10 according to an embodiment of the present invention. FIG. 2 is a cross-sectional view illustrating a state of cutting the electric chain block 10 illustrated in FIG. 1 in a plane where the motor shaft 25 is cut. FIG. 3 is a partial cross-sectional view illustrating an enlarged configuration near the motor part 20 (clutch-equipped motor) in FIG. 2. As illustrated in FIG. 1 to FIG. 3, the electric chain block 10 includes a motor part 20, a drive transmission shaft 40, a reduction mechanism 50, a load sheave 60, a brake mechanism 70, a control circuit 80, the upper hook 90, and the lower hook 100.

Figure 4:
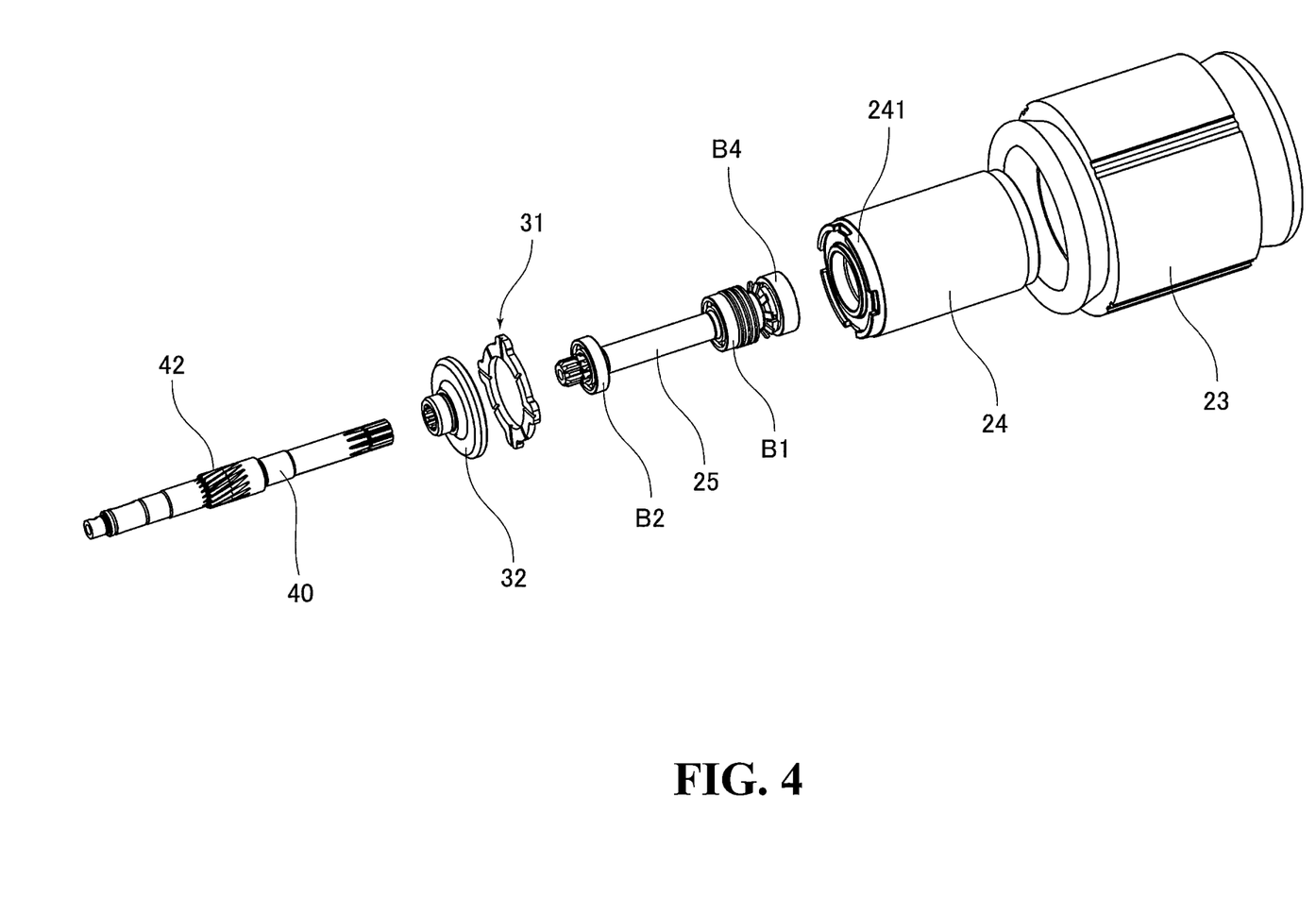
FIG. 4 is an exploded perspective view illustrating a configuration of a stator, a rotor, and a motor shaft which constitute the motor part, and a drive transmission shaft, of the electric chain block illustrated in FIG. 1.

FIG. 4 is an exploded perspective view illustrating a configuration of a stator 23, a rotor 24, and a motor shaft 25 which constitute the motor part 20, and the drive transmission shaft 40, of the electric chain block 10 illustrated in FIG. 1. As illustrated in FIG. 1 to FIG. 4, the motor part 20 has a motor casing 21, a motor 22, and a friction clutch mechanism 30. The motor casing 21 is a case covering the motor 22, and protects the motor 22 from external impact, dust, and the like. Note that the motor casing 21 includes an end cover 21A1, and the end cover 21A1 covers one side of the motor 22 in an axial direction (X-direction) (this also applies to configurations in later-explained second embodiment and third embodiment).

The motor 22 includes the stator 23 and the rotor 24, and corresponds, for example, to a three-phase induction motor. However, the motor 22 is not limited to the three-phase induction motor, but another induction motor such as a single-phase induction motor may be used therefor. Note that for the motor 22, a motor other than the induction motor may be used. Examples of the other motor include a synchronous motor and the like.

The stator 23 is non-rotatably fixed to an inner peripheral surface of the motor casing 21. Further, the stator 23 has a stator core (sign omitted) and a coil 231 formed by winding a conductive wire, and the coil 231 is formed with a cylindrical projecting portion 231a projecting from an end surface of the rotor 24 in the axial direction (X-direction) as illustrated in FIG. 2.

Besides, the rotor 24 has stacked silicon steel plates and a conductor bar made of an aluminum metal (both not illustrated), and end rings 241 arranged on both end sides of the conductor bar. Further, at a center of the rotor 24 in the radial direction, an insertion hole 242 is formed through which the motor shaft 25 is inserted. Note that to the end ring 241, a later-explained clutch plate is attached.

Further, on both end sides of the insertion hole 242 of the rotor 24 in the axial direction (X-direction), bearing attachment parts 242a which are made larger in diameter than a middle portion of the insertion hole 242 are provided, respectively. At the bearing attachment parts 242a, bearings B1, B2 are arranged. Note that the bearing B1 is arranged on one side in the axial direction (X-direction), and the bearing B2 is arranged on the other side (X2 side) in the axial direction (X-direction). By the bearings B1, B2, the rotor 24 is pivotally supported in a state of being rotatable with respect to the motor shaft 25.

Note that the bearing attachment part 242a is provided to become smaller in diameter as going to a center position of the rotor 24 in the long side direction (here, the axial direction (X-direction)). This prevents the bearing B1 arranged at the bearing attachment part 242a on the one side (X1 side) in the axial direction (X-direction) from moving to the other side (X2 side) in the axial direction (X-direction).

Further, for the motor shaft 25, a shaft member that is not hollow but is solid is used in this embodiment. The motor shaft 25 is rotatably supported on the rotor 24 via the bearings B1, B2 as explained above, that is, the motor shaft 25 is freely rotatable with respect to the rotor 24 if the later-explained friction clutch mechanism 30 is not present. A spline 251 is provided on an outer periphery of the motor shaft 25 on the other end side (X2 side) in the axial direction. The spline 251 meshes with a spline groove 321a formed on an inner cylindrical surface of a connection member 32 of the later-explained friction clutch mechanism 30. Further, the motor shaft 25 and the connection member 32 are press-fitted and fixed into a state where their axial centers coincide. Accordingly, the motor shaft 25 rotates integrally with the connection member 32 without rotational vibration.

Further, the one end side (X1 side) of the drive transmission shaft 40 in the axial direction (X-direction) is inserted into the connection member 32. A spline 41 is provided on an outer periphery of the drive transmission shaft 40 on the one end side (X1 side) in the axial direction (X-direction), and meshes with the spline groove 321a of the connection member 32. Accordingly, the driving force of the motor shaft 25 is transmitted to the drive transmission shaft 40 via the connection member 32.

Further, a gear part 42 is provided at a middle portion of the drive transmission shaft 40, and a transmission gear (not illustrated) of the reduction mechanism 50 meshes with the gear part 42. Thus, the drive of the drive transmission shaft 40 is transmitted to the load sheave 60 via the reduction mechanism 50. The load sheave 60 includes a plurality of chain pockets (sign omitted), and metal rings of the load chain C1 can fit into the chain pockets. Accordingly, the drive of the motor 22 enables winding up and down of the load chain C1.

Further, the electric chain block 10 includes the brake mechanism 70 and the control circuit 80. The brake mechanism 70 is a mechanism that is arranged on the other end side (X2 side) of the drive transmission shaft 40 and brakes the load sheave 60 to hold a cargo at a predetermined position. Further, the control circuit 80 is a circuit for controlling the actuation of the motor 22. The control circuit 80 includes a not-illustrated memory, and a program and data for executing a predetermined control are stored in the memory.

<Regarding the Friction Clutch Mechanism 30>

Figure 5:
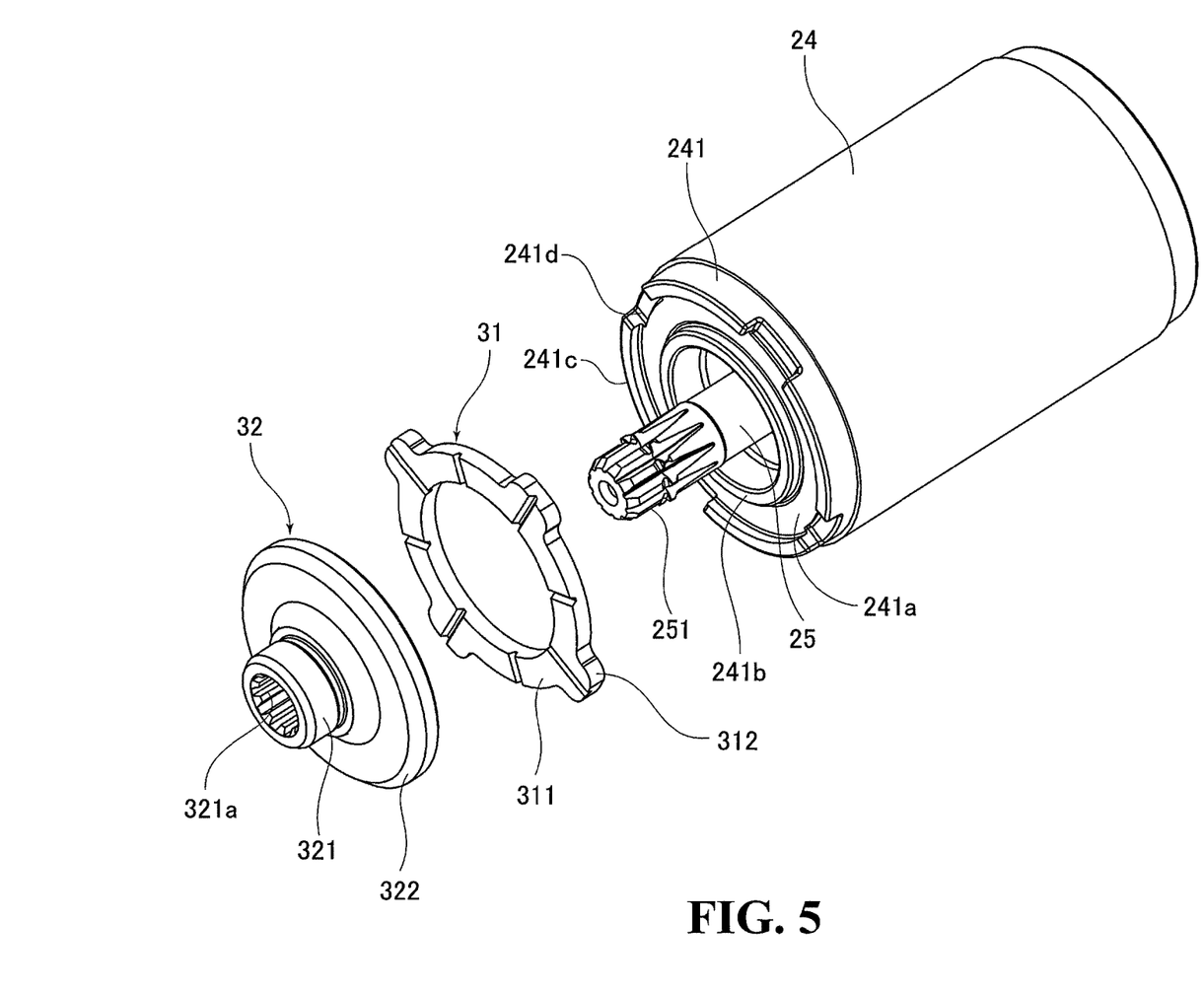
FIG. 5 is an exploded perspective view illustrating a configuration of the rotor, the motor shaft, and a clutch plate and a connection member which constitute a friction clutch, of the electric chain block illustrated in FIG. 1.

Next, the friction clutch mechanism 30 will be explained. FIG. 5 is an exploded perspective view illustrating a configuration of the rotor 24, the motor shaft 25, and a clutch plate 31 and the connection member 32 which constitute a friction clutch, of the electric chain block illustrated in FIG. 1. As illustrated in FIG. 2 to FIG. 5, the friction clutch mechanism 30 has the clutch plate 31, the connection member 32, a spring member 33, and an adjustment member 34. The clutch plate 31 of them is a member for exerting a desired frictional force with respect to a clutch receiver 322 of the connection member 32. The clutch plate 31 is made of a predetermined friction material (for example, a woven friction material, a resin mold friction material, a sintered material made by sintering a metal-containing material, or the like) as a material.

The clutch plate 31 is attached to the aforementioned end ring 241. More specifically, the end ring 241 has a flat surface 241a perpendicular to the rotation axis in a manner to come into close contact with the side surface of the clutch plate 31, and has at its central portion a boss part 241b that fits with the inner periphery of the clutch plate 31. Further, on the outer peripheral side of the end ring 241, an arc-shaped projecting part 241c projecting in the axial direction (X-direction) more than the flat surface 241a is formed. The projecting part 241c fits, in the circumferential direction, with a later-explained fitting part 312 of the clutch plate 31, and is fixed in a manner to rotate integrally with the clutch plate 31. In FIG. 5, attaching recessed parts 241d cut at a predetermined pitch are each formed between four arc-shaped projecting parts 241c. Note that the attaching recessed part 241d is provided to be recessed more by a predetermined depth in the axial direction than the flat surface 241a.

Here, the clutch plate 31 is provided with a ring-shaped part 311 and the fitting part 312 at its outer peripheral portion. The fitting part 312 is a projecting piece portion narrow in the circumferential direction in FIG. 5, but may be wide. The ring-shaped part 311 is provided in a ring shape, and its surface (surface facing the later-explained clutch receiver) is a sliding surface. Further, the fitting part (projecting piece part) 312 is a portion projecting from the ring-shaped part 311 toward the outer diameter side, and is a rotation stopping means for the clutch plate 31 by fitting with the above projecting part 241c in the circumferential direction. The projecting part 241c has an arc-shape (fan-shape) in FIG. 4 and FIG. 5 but does not need to have the arc-shape, and may have any shape as long as it is a locking shape capable of fitting with the outer peripheral portion of the clutch plate 31 and stopping the rotation of the rotor 24 in the rotation direction.

Further, the connection member 32 is provided with a cylindrical part 321 and the clutch receiver 322. The cylindrical part 321 is a portion provided in a cylindrical shape. Here, an inner cylindrical surface of the cylindrical part 321 is provided with the spline groove 321a. The spline groove 321a meshes with the above spline 251 of the motor shaft 25 and the spline 41 of the drive transmission shaft 40. The outer diameter of the spline 251 of the motor shaft 25 is slightly larger than the outer diameter of the spline 41 of the drive transmission shaft 40, and the clutch receiver 322 and the motor shaft 25 are coaxially press-fitted and fixed with each other.

Note that a bearing B3 is attached to the other side (X2 side) of the cylindrical part 321 in the axial direction (X-direction). The bearing B3 is attached to a bearing attachment part 211a of the motor casing 21. Here, a bearing B4 is attached also to the one end side (X1 side) in the axial direction (X-direction) of the motor shaft 25, and the bearing B4 is attached to a bearing attachment part 211b of the motor casing 21. By the bearings B3, B4, the motor shaft 25 is pivotally supported to be rotatable without shaft shake on the motor casing 21 to which the stator 23 is fixed. Note that the bearing B3 is provided larger in diameter than the bearing B4.

Further, the cylindrical part 321 is integrally provided with the clutch receiver 322. More specifically, the clutch receiver 322 integral with the cylindrical part 321 projects toward the outer diameter side from the outer peripheral surface of the cylindrical part 321. The clutch receiver 322 is provided in a so-called flange shape at the connection member 32. The clutch receiver 322 is a portion coming into contact with the sliding surface of the clutch plate 31 while exerting a predetermined frictional force. Note that in the case where a load equal to or less than a prescription acts on the drive transmission shaft 40 and the connection member 32 via the load sheave 60, the clutch receiver 322 follows the rotation of the clutch plate 31 by the frictional force between the clutch plate 31 and the clutch receiver 322 according to the pressing force from the later-explained spring member 33. On the other hand, in the case where an overload acts on the load sheave 60 (in the case where a load larger than the prescription acts), the clutch receiver 322 cannot follow any longer the rotation of the clutch plate 31 due to the action of a load larger than the frictional force between the clutch plate 31 and the clutch receiver 322 according to the pressing force from the later-explained spring member 33. Thus, even if the rotor 24 which rotates integrally with the clutch plate 31 rotates, the connection member 32 side becomes a state of not rotating (a state of the rotor 24 idling).

Here, the clutch plate 31 and the clutch receiver 322 of the connection member 32 are arranged at a portion of the stator 23 surrounded by the cylindrical projecting portion 231a (inner cylinder side of the projecting portion 231a). Therefore, as compared with a configuration in which the clutch plate 31 and the connection member 32 are arranged at a portion projecting from the outside of the projecting portion 231a (the inner cylinder side of the projecting portion 231a) to the other side (X2 side) in the axial direction (X-direction), the inner cylinder side of the projecting portion 231a being a dead space can be more effectively used, thereby making it possible to shorten the entire length of the motor part 20 in the axial direction (X-direction).

Further, the cylindrical part 321 and the clutch receiver 322 are integrated as explained above, so that the clutch receiver 322 becomes a state of coming into contact with the clutch plate 31 in parallel. Here, in the case where the clutch receiver 322 does not come into contact with the clutch plate 31 in parallel because the cylindrical part 321 and the clutch receiver 322 are separate bodies or the like, the clutch receiver 322 becomes a state of being obliquely pressed by the clutch plate 31. In this case, the stability of the rotation of the connection member 32 may be lost to cause vibration of the motor part 20 and other portions due to the connection member 32. However, the cylindrical part 321 and the clutch receiver 322 are integrated, thereby making it possible to prevent the occurrence of such vibration.

Further, on the one side (X1 side) of the rotor 24 in the axial direction (X-direction), the spring member 33 is arranged in a state of being adjacent to the bearing B1. Note that the spring member 33 corresponds to a biasing means. The spring member 33 is constituted by stacking a plurality of disc springs 33a in the axial direction (X-direction) in this embodiment. Further, the adjustment member 34 is arranged on a side closer to the one side (X1 side) in the axial direction (X-direction) than the spring member 33. The adjustment member 34 is a nut in this embodiment, and can be screwed into a male screw part (sign omitted) formed on the one end side of the motor shaft 25. Note that between the adjustment member 34 and the spring member 33, a washer Z1 for stopping the rotation of the adjustment member 34 and a spacer Si as a hollow shaft are arranged, and the adjustment member 34 presses the spring member 33 via the washer Z1 and the spacer Si as the hollow shaft. Further, the connection member 32 is press-fitted and fixed to the motor shaft 25 and is integral with the motor shaft 25. The clutch receiver 322 of the connection member 32 can receive the pressing force by the spring member 33.

Here, when the above adjustment member 34 is screwed into the other side (X2 side) in the axial direction (X-direction), the spring member 33 gradually strongly presses an inner race of the bearing B1 toward the other side (X2 side) as the screwing proceeds, and the rotor 24 and the clutch plate 31 are gradually strongly pressed to the other side (X2 side) in the axial direction (X-direction) via the bearing B1. More specifically, the adjustment of the degree of screwing of the adjustment member 34 after assembly of the motor 22 and before attachment of the motor casing 21 makes it possible to easily perform adjustment of the biasing force of the spring member 33, and the adjustment of the biasing force makes it possible to adjust the frictional force between the clutch plate 31 and the clutch receiver 322. In this manner, the frictional force between the clutch plate 31 and the clutch receiver 322 can be adjusted before incorporation in the inner peripheral part of the stator 23.

Note that the provision of the friction clutch mechanism 30 makes the clutch receiver 322 unable to follow the frictional force between the clutch plate 31 and the clutch receiver 322 by the press of the spring member 33 (biasing means) when a load larger than the prescription (overload) is transmitted to the connection member 32, resulting in that the clutch plate 31 (rotor 24) idles with respect to the clutch receiver 322 (connection member 32).

Note that the electric chain block 10 includes the upper hook 90 and the lower hook 100 in addition to the above configuration. The upper hook 90 is a portion that is hooked on, for example, a predetermined site such as a ceiling or the like. Besides, the lower hook 100 is a portion that hooks a cargo or the like and is coupled to an end portion of the chain C1. By winding up and down the chain C1 with the cargo hooked on the lower hook 100, the electric chain block 10 can raise and lower the cargo.

Note that unlike the above, the orientation of the electric chain block 10 may be turned upside down, the lower hook 100 may be hooked on, for example, a predetermined site such as a ceiling or the like, and the cargo may be hooked on the upper hook 90. In the case of this configuration, when the chain C1 is wound up and down, the electric chain block 10 is raised and lowered and the cargo is also raised and lowered therewith.

<Regarding the Effects>

The motor part 20 (clutch-equipped motor) having the above configuration includes: the stator 23 capable of generating a rotating magnetic field by passing a current through the coil 231; the rotor 24 arranged in the inner cylindrical portion of the stator 23 and rotated by the rotating magnetic field; the motor shaft 25 inserted through the center in the radial direction of the rotor 24 and capable of rotating with respect to the rotor 24 via the bearing (bearings B1, B2); and the friction clutch mechanism 30 arranged on the end portion side of the rotor 24 in the axial direction (X-direction) of the motor shaft 25. Further, the friction clutch mechanism 30 has: the clutch plate 31 fixed to the end surface side of the rotor 24 in the axial direction (X-direction) of the motor shaft 25 and thereby rotating integrally with the rotor 24; the connection member 32 having the cylindrical part 321, the motor shaft 25 and the drive transmission shaft 40 being inserted into an inner cylindrical portion of the cylindrical part 321 in a state of rotating integrally with the cylindrical part 321; the clutch receiver 322 arranged on the outer peripheral side of the connection member 32 and rotating integrally with the connection member 32; and the spring member 33 (biasing means) for biasing the clutch plate 31 and the clutch receiver 322 in a direction of bringing them into contact with each other.

In the case of constituting the above, the clutch receiver 322 is arranged on the outer peripheral side of the connection member 32. Therefore, as compared with the configuration disclosed in Patent Literature 1 in which the connection member and the clutch receiver are separately and independently arranged in the axial direction (X-direction) of the motor shaft 25, the length of the motor shaft 25 in the axial direction (X-direction) can be made shorter to reduce the size of the motor part 20 (clutch-equipped motor).

Further, unlike the large-diameter hollow shaft having the same diameter as that of the connection member as disclosed in Patent Literature 2, the motor shaft 25 is a solid shaft smaller in diameter than the cylindrical part 321 of the connection member 32 in the above embodiment. This makes it possible to prevent the motor part 20 (clutch-equipped motor) from increasing in size in the radial direction. Further, as for the vibration when the friction clutch mechanism 30 is activated, the bearing B3 larger in diameter than the bearing B4 which bears the one end side of the motor shaft 25 directly bears the cylindrical part 321 of the connection member 32 having the clutch receiver 322, thus improving the bearing life and stabilizing the friction performance.

Further, the clutch receiver 322 is provided in a flange shape and formed integrally with the cylindrical part in this embodiment.

In the case of constituting the above, the cylindrical part 321 and the clutch receiver 322 are integrally formed, so that the clutch receiver 322 projects in a direction perpendicular to the axial direction (X-direction) over the entire circumference in the circumferential direction. Therefore, the clutch receiver 322 becomes a state of coming into contact with the clutch plate 31 in parallel over the entire circumference in the circumferential direction. Here in the case where the clutch receiver 322 does not come into contact with the clutch plate 31 in parallel because the cylindrical part 321 and the clutch receiver 322 are separate bodies, the clutch receiver 322 becomes a state of being obliquely pressed by the clutch plate 31. In this case, the stability of the rotation of the connection member 32 may be lost to cause vibration at the motor part 20 and other portions due to the connection member 32. However, the cylindrical part 321 and the clutch receiver 322 are integrally formed. Therefore, it is possible to prevent generation of the above vibration.

Further, the electric chain block 10 in this embodiment includes: the motor part 20 (clutch-equipped motor); the drive transmission shaft 40 arranged on the same axis as the motor shaft 25 and rotating integrally with the motor shaft 25; the reduction mechanism 50 for reducing the speed of the rotation from the drive transmission shaft 40; and the load sheave 60 to which the driving force is transmitted via the reduction mechanism 50 and around which the chain C1 is wound.

In the case of constituting the above, as compared with the configuration disclosed in Patent Literature 1 in which the connection member and the clutch receiver are separately and independently arranged in the axial direction (X-direction) of the motor shaft 25, the length of the motor shaft 25 in the axial direction (X-direction) can be made shorter to reduce the size of the motor part 20 (clutch-equipped motor). Accordingly, the dimension of the electric chain block 10 in the axial direction (X-direction) can be reduced, and the size of the electric chain block 10 can be accordingly reduced.

Further, unlike the large-diameter hollow shaft having the same diameter as that of the connection member as disclosed in Patent Literature 2, the motor shaft 25 is a solid shaft smaller in diameter than the cylindrical part 321 of the connection member 32 in the above embodiment. This makes it possible to prevent the motor part 20 (clutch-equipped motor) from increasing in size in the radial direction. Further, as for the vibration when the friction clutch mechanism 30 is activated, the bearing B3 larger in diameter than the bearing B4 which bears the one end side of the motor shaft 25 directly bears the cylindrical part 321 of the connection member 32 having the clutch receiver 322, thus improving the bearing life and stabilizing the friction performance. Accordingly, the electric chain block 10 can be prevented from increasing in size in a direction perpendicular to the axial direction (X-direction) and exhibit stable performance with long life.

Second Embodiment

Hereinafter, an electric chain block 10 including a motor part 20 (clutch-equipped motor) according to a second embodiment of the present invention will be explained. Note that the motor part 20 (clutch-equipped motor) in this embodiment has the same configuration as that of the motor part 20 according to the first embodiment. Accordingly, portions common to those in the first embodiment will be explained using the same signs in the following explanation.

Figure 6:
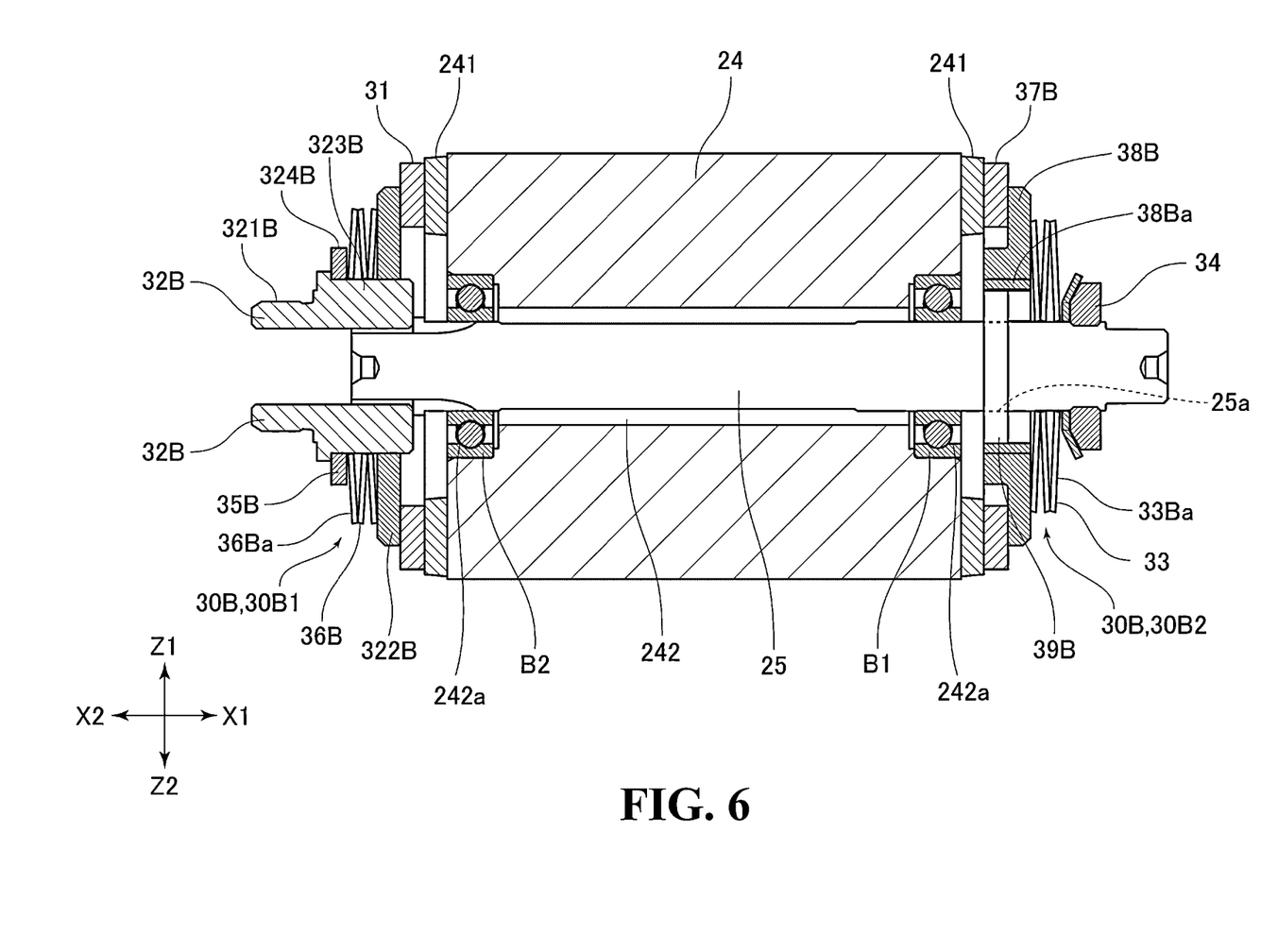
FIG. 6 is a cross-sectional view illustrating a configuration near a friction clutch mechanism and a rotor according to a second embodiment.

FIG. 6 is a cross-sectional view illustrating the configuration near a friction clutch mechanism 30B and a rotor 24 according to the second embodiment. In this embodiment, the configuration of the friction clutch mechanism 30 is different from that of the friction clutch mechanism 30 according to the above first embodiment. In the following explanation, the friction clutch mechanism 30 according to the second embodiment is called a friction clutch mechanism 30B and an original configuration of the friction clutch mechanism 30B will be explained with an alphabet "B" added behind the sign.

In this embodiment, the friction clutch mechanism 30B is provided with a first friction clutch mechanism 30B1 and a second friction clutch mechanism 30B2. However, an adjustment member 34 and a washer Z1 are also present as a configuration common to the first friction clutch mechanism 30B1 and the second friction clutch mechanism 30B2. Hereinafter, they will be explained in detail.

The first friction clutch mechanism 30B1 is arranged on the other side (X2 side) of the rotor 24 in the axial direction (X-direction). The first friction clutch mechanism 30B1 has a clutch plate 31 which are similar to those in the first embodiment, a connection member 32B, a clutch receiver 322B, a spring receiver 35B, and a spring member 36B. The connection member 32B of them has a cylindrical part 321B different in shape from the above cylindrical part 321. The cylindrical part 321B is not integrally provided with a portion similar to the clutch receiver 322. In other words, the clutch receiver 322B is provided separately from the connection member 32B. Further, the connection member 32B is provided with a large-diameter part 323B formed larger in diameter than the other side in the axial direction (X-direction).

On the outer peripheral side of the large-diameter part 323B, the clutch receiver 322B separate from the connection member 32B is arranged. Accordingly, the clutch receiver 322B is provided in a ring shape, and the clutch receiver 322B is coupled to the outer peripheral surface of the connection member 32B by the spline coupling or by using a later-explained pin member 39B and a pin member similar to the pin member 39 so as not for the clutch receiver 322B to rotate with respect to the connection member 32B.

Here, on the other end side (X2 side) of the large-diameter part 323B in the axial direction (X-direction), a locking projection 324B is provided, and the locking projection 324B projects toward the outer diameter side more than the large-diameter part 323B. At the locking projection 324B, the spring receiver 35B in a ring shape is arranged. Further, between the spring receiver 35B and the clutch receiver 322B, a spring member 36B is arranged. Note that the connection member 32B and the motor shaft 25 are strongly press-fitted and fixed on the same axial center as with the configuration in the above first embodiment. Accordingly, the spring member 36B presses the clutch plate 31 toward the clutch receiver 322B via the second friction clutch mechanism 30B2 and the rotor 24 by tightening the adjustment member 34, and the spring member 36B adjustably receives and transmits the pressing force together with the spring member 33. Note that the spring member 36B is configured by stacking a plurality of disc springs 33Ba in the axial direction (X-direction) as with the spring member 33.

Besides, the second friction clutch mechanism 30B2 is arranged on the one side (X1 side) of the rotor 24 in the axial direction (X-direction). The second friction clutch mechanism 30B2 has a clutch plate 37B, a clutch receiver 38B, and a spring member 33.

The clutch plate 37B of them is fixed to an end ring 241 on the one side (X1 side) in the axial direction (X-direction). Further, the clutch receiver 38B in contact with a surface of the clutch plate 37B on the one side (X1 side) has a surface on the one side (X1 side) which is pressed by the spring member 33, and the pressing by the spring member 33 generates a predetermined frictional force between the clutch receiver 38B and the clutch plate 37B.

Here, the motor shaft 25 has a pin hole 25a into which the pin member 39B is inserted and which is formed in a manner to penetrate along the radial direction. The pin member 39B inserted into the pin hole 25a is inserted also into a pin insertion hole 38Ba of the above clutch receiver 38B. Note that the pin insertion hole 38Ba is a narrow hole portion formed along the radial direction as with the above pin hole 25a. Here, to make the clutch receiver 38B movable along the axial direction (X-direction), the pin insertion hole 38Ba penetrates the clutch receiver 38B in the axial direction (X-direction). Accordingly, the clutch receiver 38B is movable in the axial direction (X-direction) by fluctuation of the pressing state by the spring member 33. However, the movement of the clutch receiver 38B in the rotation direction is inhibited by the pin member 39B.

In the case of using the friction clutch mechanism 30B having the above configuration, it is possible to use two friction clutch mechanisms such as the first friction clutch mechanism 30B1 and the second friction clutch mechanism 30B2, thereby extending the life of the friction clutch mechanism 30B. Further, it is possible to use the two friction clutch mechanisms, thereby increasing the value of load torque transmitted by the rotor 24 even having a small diameter. Further, the pressing force acting between the clutch plate 31 and the clutch receiver 322B does not act on the bearings B1, B2, thereby making it possible to increase the tightening by the adjustment member 34 and to apply the friction clutch mechanism 30B to the electric chain block 10 employing a motor with high torque. Note that adjusting the degree of screwing the adjustment member 34 makes it possible to easily perform adjustment of the biasing force of the spring members 33, 36B, and the adjustment of the biasing force makes it possible to adjust the frictional force between the clutch plates 31, 37B and the clutch receivers 322B, 28B.

Further, in this embodiment, the clutch receiver 322B is provided in a ring shape separate from the connection member 32B, and the clutch receiver 322B is coupled to the outer peripheral surface of the connection member 32B in a state of rotating integrally therewith.

Therefore, it is possible to move the clutch receiver 322B in the axial direction (X-direction) in a state of independent from the connection member 32B, and thereby arranging the spring member 36B on the outer peripheral side of the connection member 32B as illustrated in FIG. 6.

Note that it is possible to produce the same effects also in this embodiment as those in the configuration in the above first embodiment. More specifically, as compared with the configuration in which the connection member and the clutch receiver are separately and independently arranged in the axial direction (X-direction) of the motor shaft 25, the length of the motor shaft 25 in the axial direction (X-direction) can be made shorter to reduce the size of the motor part 20 (clutch-equipped motor) in the configuration in this embodiment.

Further, unlike the large-diameter hollow shaft having the same diameter as that of the connection member as disclosed in Patent Literature 2, the motor shaft 25 is a solid shaft smaller in diameter than the cylindrical part 321B of the connection member 32B in the above embodiment. This makes it possible to prevent the motor part 20 (clutch-equipped motor) from increasing in size in the radial direction. Further, as for the vibration when the friction clutch mechanism 30 is activated, the bearing B3 larger in diameter than the bearing B4 which bears the one end side of the motor shaft 25 directly bears the cylindrical part 321 of the connection member 32 having the clutch receiver 322, thus improving the bearing life and stabilizing the friction performance.

Third Embodiment

Hereinafter, an electric chain block 10 including a motor part 20 (clutch-equipped motor) according to a third embodiment of the present invention will be explained. Note that the motor part 20 (clutch-equipped motor) in this embodiment has the same configuration as that of the motor part 20 according to the first embodiment. Accordingly, portions common to those in the first embodiment will be explained using the same signs in the following explanation.

In this embodiment, the configuration of a friction clutch mechanism 30 is different from that of the friction clutch mechanism 30 according to the above first embodiment and the friction clutch mechanism 30B according to the above second embodiment. In the following explanation, the friction clutch mechanism 30 according to the third embodiment is called a friction clutch mechanism 30C and an original configuration of the friction clutch mechanism 30C will be explained with an alphabet "C" added behind the sign.

Figure 7:
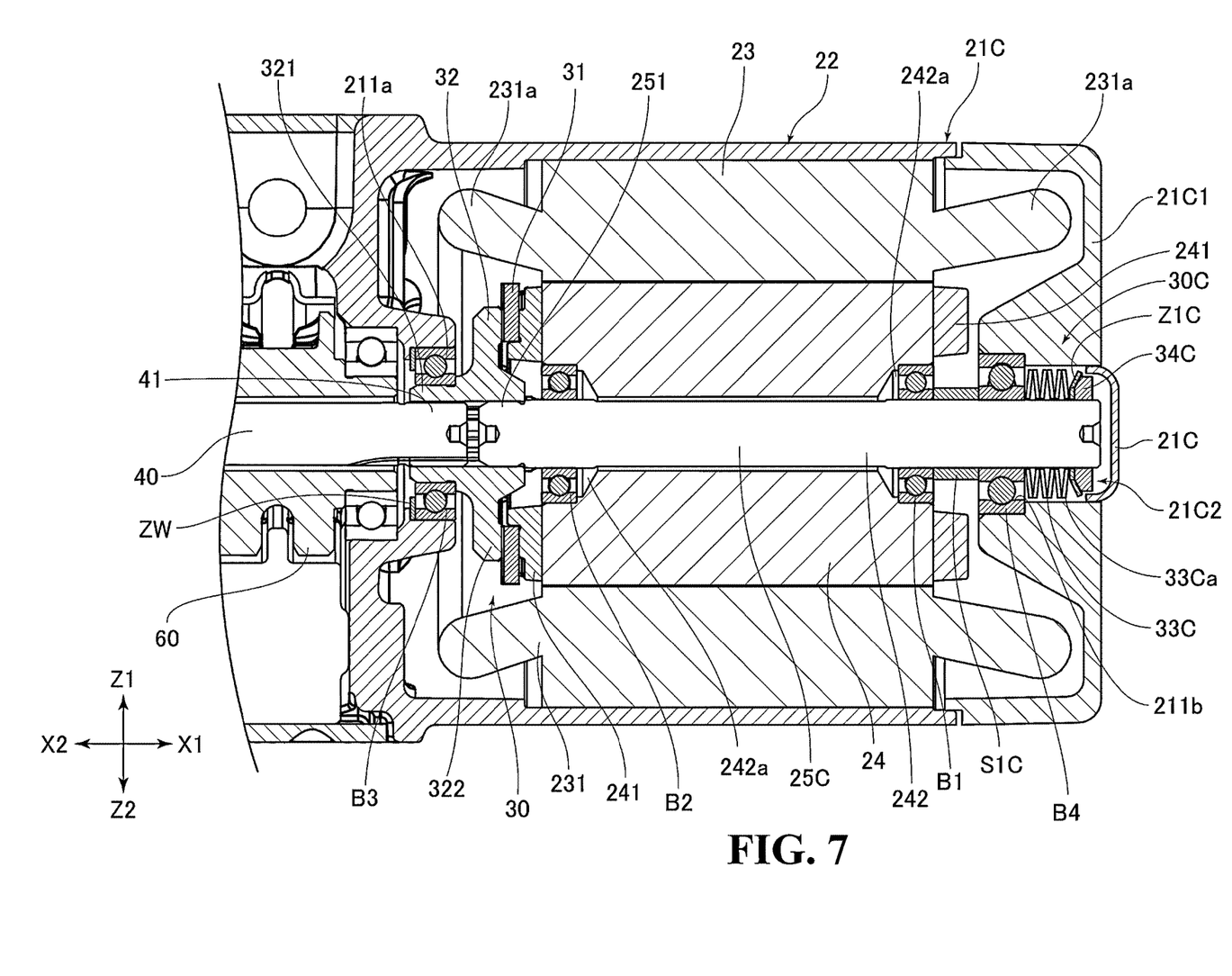
FIG. 7 is a cross-sectional view illustrating a configuration of a motor part having a friction clutch mechanism according to a third embodiment.

FIG. 7 is a cross-sectional view illustrating the configuration of the motor part 20 having the friction clutch mechanism 30C according to the third embodiment. As illustrated in FIG. 7, a shaft hole 21C2 is formed at an end cover 21C1 in the axial direction (X-direction) of a motor casing 21C in this embodiment. A bearing B4 is arranged in the shaft hole 21C2, and a motor shaft 25C extends toward the outer side of the shaft hole 21C2 more than the bearing B4. A not-illustrated male screw portion is formed at a tip portion of the extending portion, and an adjustment member 34C is screwed into the male screw portion. A disc spring 33Ca constituting a spring member 33C is arranged between the adjustment member 34C and the bearing B4, and screws the adjustment member 34C to press the spring member 33C and the inner race of the bearing B4. A spacer S1C in a hollow shaft shape is arranged between the bearing B4 and the bearing B1, and a pressing force is transmitted to the rotor 24 via inner races of them. Accordingly, the motor shaft 25C is provided having a length in the axial direction (X-direction) that is the same as or longer than those of the motor shafts 25 in the first embodiment and the second embodiment.

Further, the tip side of the motor shaft 25C in the axial direction (X-direction) is located outside the motor casing 21C, and a resin cap 21C3 is arranged on the tip side and seals the shaft hole 21C2 so as to prevent intrusion of dust and rainwater into the inside of the motor casing 21C, one end portion of the motor shaft 25C, the adjustment member 34C, the spring member, and so on. Further, the bearing B3 and a wave washer ZW for bearing are arranged at a bearing attachment part 211a of the motor casing 21C to absorb the thickness fluctuation of the clutch plate 31 due to the wear to prevent rattling of the motor shaft 25.

In the case of constituting the above, the tip side of the motor shaft 25C is located in the shaft hole 21C2 of the motor casing 21C, and the adjustment member 34C for adjusting the biasing force of the spring member 33C (biasing means) is screwed into the male screw portion of the motor shaft 25C located in the shaft hole 21C2.

The arrangement of the adjustment member 34C outside the motor casing 21C as explained above enables a work of screwing the adjustment member 34C being a nut even if the motor casing 21C is not disassembled. Accordingly, only adjusting a screwing amount (screwing torque) of the adjustment member 34C makes it possible to easily perform adjustment of the biasing force of the spring member 33C by adjusting the degree of screwing the adjustment member 34 after assembly of the motor 22 and before attachment of the motor casing 21. Accordingly, the adjustment of the biasing force makes it possible to adjust the frictional force of the friction clutch mechanism Note that the friction clutch mechanism 30C can produce the same operation and effects as those of the above friction clutch mechanism 30 in the first embodiment.

Modification Example

Although embodiments of the present invention have been explained above, the present invention can be modified in addition to them. The modifications will be explained below.

In the above third embodiment, a friction clutch mechanism 30B similar to that explained in the above second embodiment may be used. More specifically, in the friction clutch mechanism 30C, a first friction clutch mechanism similar to the first friction clutch mechanism 30B1 may be used and a second friction clutch mechanism similar to the second friction clutch mechanism 30B2 may be used.

Besides, the one end side of the motor shaft 25C illustrated in FIG. 7 may be further extended to protrude to the one side in the axial direction (X-direction) more than the end cover 21C1, and a cooling fan may be attached thereto for instance.

The invention claimed is:

1. A clutch-equipped motor for transmitting a driving force to a drive transmission shaft, the clutch-equipped motor comprising:
   a stator configured to generate a rotating magnetic field by passing a current through a coil;
   a rotor in an inner cylindrical portion of the stator and rotatable by the rotating magnetic field;
   a motor shaft through a center in a radial direction of the rotor and configured to rotate with respect to the rotor via a bearing; and
   a friction clutch mechanism on an end portion side of the rotor in an axial direction of the motor shaft, wherein the friction clutch mechanism has:
      a clutch plate fixed to an end surface side of the rotor in the axial direction of the motor shaft and configured to rotate integrally with the rotor;
      a connection member having a cylindrical part, the motor shaft and the drive transmission shaft being in an inner cylindrical portion of the cylindrical part of the connection member so as be rotatable integrally and synchronously with the cylindrical part;
      a clutch receiver on an outer peripheral side of the connection member and configured to rotate integrally with the connection member; and
      a biasing member configured to bias the clutch plate and the clutch receiver in a direction of bringing the clutch plate and the clutch receiver into contact with each other.

2. The clutch-equipped motor according to claim 1, wherein
   the clutch receiver is a flange shape and formed integrally with the cylindrical part of the connection member.

3. The clutch-equipped motor according to claim 2, wherein
   a tip side of the motor shaft is in a shaft hole of a motor casing for housing the stator and the rotor, and
   an adjuster configured to adjust a biasing force of the biasing member is screwed into a male screw portion on the tip side of the motor shaft in the shaft hole.

4. An electric chain block comprising:
   the clutch-equipped motor according to claim 2;
   the drive transmission shaft on a same axis as the motor shaft and configured to rotate integrally with the motor shaft;
   a reducer configured to reduce a speed of rotation from the drive transmission shaft; and
   a load sheave to which a driving force is transmitted via the reducer and around which a chain is wound.

5. The clutch-equipped motor according to claim 1, wherein:
   the clutch receiver is a ring shape separate from the connection member; and
   the clutch receiver is coupled to an outer peripheral surface of the connection member so as to be rotatable integrally therewith.

6. The clutch-equipped motor according to claim 5, wherein
   a tip side of the motor shaft is in a shaft hole of a motor casing for housing the stator and the rotor, and
   an adjuster configured to adjust a biasing force of the biasing member is screwed into a male screw portion on the tip side of the motor shaft in the shaft hole.

7. An electric chain block comprising:
   the clutch-equipped motor according to claim 5;
   the drive transmission shaft on a same axis as the motor shaft and configured to rotate integrally with the motor shaft;
   a reducer configured to reduce a speed of rotation from the drive transmission shaft; and
   a load sheave to which a driving force is transmitted via the reducer and around which a chain is wound.

8. The clutch-equipped motor according to claim 1, wherein
   a tip side of the motor shaft is in a shaft hole of a motor casing for housing the stator and the rotor, and
   an adjustment member configured to adjust a biasing force of the biasing member is screwed into a male screw portion on the tip side of the motor shaft in the shaft hole.

9. An electric chain block comprising:
   the clutch-equipped motor according to claim 8;
   the drive transmission shaft on a same axis as the motor shaft and configured to rotate integrally with the motor shaft;
   a reducer configured to reduce a speed of rotation from the drive transmission shaft; and
   a load sheave to which a driving force is transmitted via the reducer and around which a chain is wound.

10. An electric chain block comprising:
    the clutch-equipped motor according to claim 1;
    the drive transmission shaft on a same axis as the motor shaft and configured to rotate integrally with the motor shaft;
    a reducer configured to reduce a speed of rotation from the drive transmission shaft; and
    a load sheave to which a driving force is transmitted via the reducer and around which a chain is wound.

11. The clutch-equipped motor according to claim 1, wherein the biasing member is a spring.

* * * * *